UNITED STATES PATENT OFFICE.

WALTER O. SNELLING, OF PITTSBURGH, PENNSYLVANIA.

BATTERY-ELECTRODE.

1,288,722.  Specification of Letters Patent.  Patented Dec. 24, 1918.

No Drawing.  Application filed April 24, 1915.  Serial No. 23,746.

*To all whom it may concern:*

Be it known that I, WALTER O. SNELLING, a citizen of the United States, and a resident of Pittsburgh, in the county of Allegheny and State of Pennsylvania, have invented a new and useful Improvement in Battery-Electrodes, of which the following is a specification.

My invention relates to galvanic cells of the Leclanché and similar types, and it has for its object to provide effective depolarizing electrodes for use in such cells. More specifically, my object is to increase the activity of battery depolarizing materials by the addition of catalytic agents to the usual electrode compositions.

Galvanic cells, of which the Leclanché or sal-ammoniac cell is a familiar example, are in common use for light open-circuit work, such as the operation of electric bells, annunciators and the like. These cells have the serious disadvantage that they rapidly decrease in voltage when placed in closed circuit, by reason of accumulations of polarizing gases on the surface of the positive electrodes. For removing the polarizing gases, it is usual to associate a depolarizing agent with the positive electrode, oxidizing agents such as manganese dioxid and mercuric oxid being commonly used for this purpose. It is found, however, that the action of the usual depolarizing agents is relatively slow and incomplete as is indicated by the fact that cells of this type fall off rapidly in voltage, notwithstanding the presence of depolarizers, and must be given long rest periods in order to recover their original potential difference.

I have discovered that the depolarizing action of manganese dioxid and other depolarizing agents may be hastened by the addition of a small amount of catalytic material, and that the regeneration of the depolarizer during the rest periods of the battery is also hastened by the presence of catalysts. I am therefore able, by incorporating suitable catalytic material with the usual oxidizing depolarizers, to greatly increase the period of time during which a galvanic cell will produce current at normal average potential on closed circuit, and I am also able to shorten the rest periods necessary to restore the cell to full voltage.

Advantage may be taken of my invention to improve the action of many kinds of depolarizers, and I do not wish to be restricted to the use of any specific depolarizing material or form of material. At present, I prefer to employ a solid depolarizer, and I find that manganese dioxid is well suited to my requirements. Many catalytic materials are likewise suitable for my present purpose, examples of which are nickel oxid, iron oxids, metallic nickel and the metals of the platinum group, especially platinum and palladium. The metals mentioned may be used either in a finely granulated or colloidal condition. Metallic nickel, nickel oxid and iron oxids are to be preferred for use in commercial cells, on account of their relative cheapness in comparison with such expensive catalysts as platinum and palladium.

The catalytic material may be incorporated with the depolarizer by merely mixing the two materials together, or the depolarizing agent, granular manganese dioxid for example, may be coated or impregnated with the catalytic material. The depolarizer, together with the catalyst, may be associated with the carbon electrode in any usual or convenient manner. According to one well-known procedure, the carbon and the depolarizer, in granular form, are formed into solid electrode-masses with the aid of a small amount, usually not exceeding five or ten per cent. of an adhesive binder such as resin or pitch.

In making a typical electrode composition, I mix about 49½ parts of granular gas carbon, about 49½ parts of granular manganese dioxid, with which is incorporated a minute amount, about 1% of the weight of manganese dioxid, of a suitable catalyst such as finely divided nickel oxid, and about one part of a resinous binder. These ingredients are thoroughly mixed and molded into any desired form.

Another effective electrode composition may be made by mixing about 40 parts of granular gas carbon, about 58 parts of granular manganese dioxid impregnated with about ½% of the weight of manganese dioxid of colloidal platinum and about 2 parts of a suitable binder, mixing the ingredients intimately and molding into electrode shapes.

The proportions mentioned may be varied within a wide range. In general, the manganese dioxid should equal or exceed the amount of carbon, and only enough binder need be used to hold the materials together.

It will be noted that no great amount of catalytic agent is necessary, small fractions of one per cent. of the electrode mass being sometimes sufficient to produce the desired effects. The amount of catalytic material to be used will vary according to the activity of the catalyst selected, minute amounts of very active catalysts being sufficient, while larger amounts of less active substances are necessary. Most very active catalysts deteriorate rapidly, and therefore I prefer to employ for commercial use a relatively large amount of a catalyst which is only moderately active but which will remain effective for a long time.

One desirable method of making intimate mixtures of catalytic agents with manganese dioxid, manganese trioxid and similar depolarizers consists in simultaneously precipitating the depolarizing material from a suitable solution together with a catalytic material. For example, a very effective depolarizing mixture may be prepared by mixing a solution of a suitable salt of manganese with ferric chlorid, and adding ammonia. The slimy precipitate, consisting of mixed manganese hydroxid and ferric hydroxid is washed, and a small amount of a platinum salt, such as ammonium platinic chlorid, may be added to increase the final amount of catalytic material. The whole mixture is then dried and ignited strongly in an oxidizing atmosphere, producing an intimate mixture of manganese oxid, iron oxid and spongy platinum. Further amounts of catalytic material may be added, if desired.

The improved results obtained by the addition of catalytic agents to depolarizers may be variously explained. The catalyst may promote the oxidization of the hydrogen evolved at the carbon pole by forming an unstable hydrogen compound which rapidly decomposes and gives up the hydrogen to the manganese dioxid or other oxidizing depolarizer; or the catalyst may act by splitting up the ammonia that is evolved in the operation of the sal-ammoniac cell and either transferring the hydrogen so produced to the oxidizing depolarizer or retaining both the nitrogen and the hydrogen in the form of absorption films or actual compounds. Whatever may be the reactions involved, the essential fact is that the addition of catalytic agents to battery depolarizers results in greatly increased efficiency.

As indicated above, the presence of catalytic material also hastens the regeneration of the manganese dioxid or other depolarizing agent during the rest periods of the battery, and thereby shortens the necessary length of such rest periods. The reaction produced by the catalytic materials which I employ are reversible, and the catalysts therefore assist in restoring the depolarizer to its active highly oxidized condition.

The addition of catalytic agents to the usual depolarizers improves the operation of dry batteries as well as of wet cells, and greatly lengthens their effective life.

In the present specification and claims, the terms "electric battery" and "electric cell" are intended to include all forms of apparatus in which electric energy is produced through chemical action. It is obvious that the materials and process steps set forth above may be variously modified by persons skilled in the electrochemical art without exceeding the bounds of my invention, and I therefore desire that no limitations shall be imposed upon my invention unless indicated in the appended claims.

I claim as my invention:

1. An electrode for primary electric batteries containing a depolarizing agent which comprises a depolarizing material and finely divided catalytic nickel.

2. An electrode for primary galvanic cells comprising carbon, manganese dioxid and finely-divided catalytic nickel.

3. An electrode for primary galvanic cells comprising granular carbon, granular manganese dioxid and not substantially more than one per cent. of a finely divided nickelous catalyst.

4. An electrode for primary galvanic cells comprising granular carbon, granular manganese dioxid and not substantially more than one per cent. of finely divided metallic nickel.

In testimony whereof, I have hereunto subscribed my name this 22nd day of April, 1915.

WALTER O. SNELLING.

Witnesses:
M. R. McKeown,
J. G. Kaiser.